(12) United States Patent
Hwang

(10) Patent No.: US 7,121,302 B2
(45) Date of Patent: Oct. 17, 2006

(54) AIR TAP ASSEMBLY

(76) Inventor: Mike Hwang, 7019 Abbottswood Dr., Rancho Palos Verdes, CA (US) 90275

( * ) Notice: Subject to any disclaimer, the term of this patent is extended or adjusted under 35 U.S.C. 154(b) by 259 days.

(21) Appl. No.: 10/894,519

(22) Filed: Jul. 20, 2004

(65) Prior Publication Data

US 2006/0016488 A1    Jan. 26, 2006

(51) Int. Cl.
*F16K 15/20* (2006.01)
(52) U.S. Cl. .................... 137/599.18; 251/82
(58) Field of Classification Search ........... 137/599.18; 251/82, 346
See application file for complete search history.

(56) References Cited

U.S. PATENT DOCUMENTS

| | | | |
|---|---|---|---|
| 2,924,237 A * | 2/1960 | Ellis | 137/599.18 |
| 3,260,276 A * | 7/1966 | Stasiunas | 137/234.5 |
| 3,454,032 A * | 7/1969 | Hinz et al. | 137/218 |
| 4,072,171 A * | 2/1978 | Nakazawa | 137/599.18 |
| 5,203,831 A * | 4/1993 | Lind et al. | 137/223 |

* cited by examiner

*Primary Examiner*—Stephen M. Hepperle
(74) *Attorney, Agent, or Firm*—Alan D. Kamrath; Nikolai & Mersereau, P.A.

(57) ABSTRACT

An air tap assembly includes a mounting seat, a connecting member, a stop member, and an end cap. Thus, the stop plate of the stop member prevents the air from flowing back into the vent holes of the second pivot portion of the connecting member, so that the air tap assembly has an anti-reverse effect to prevents the air from flowing back into the air cushion, thereby facilitating a user folding the air cushion.

18 Claims, 5 Drawing Sheets

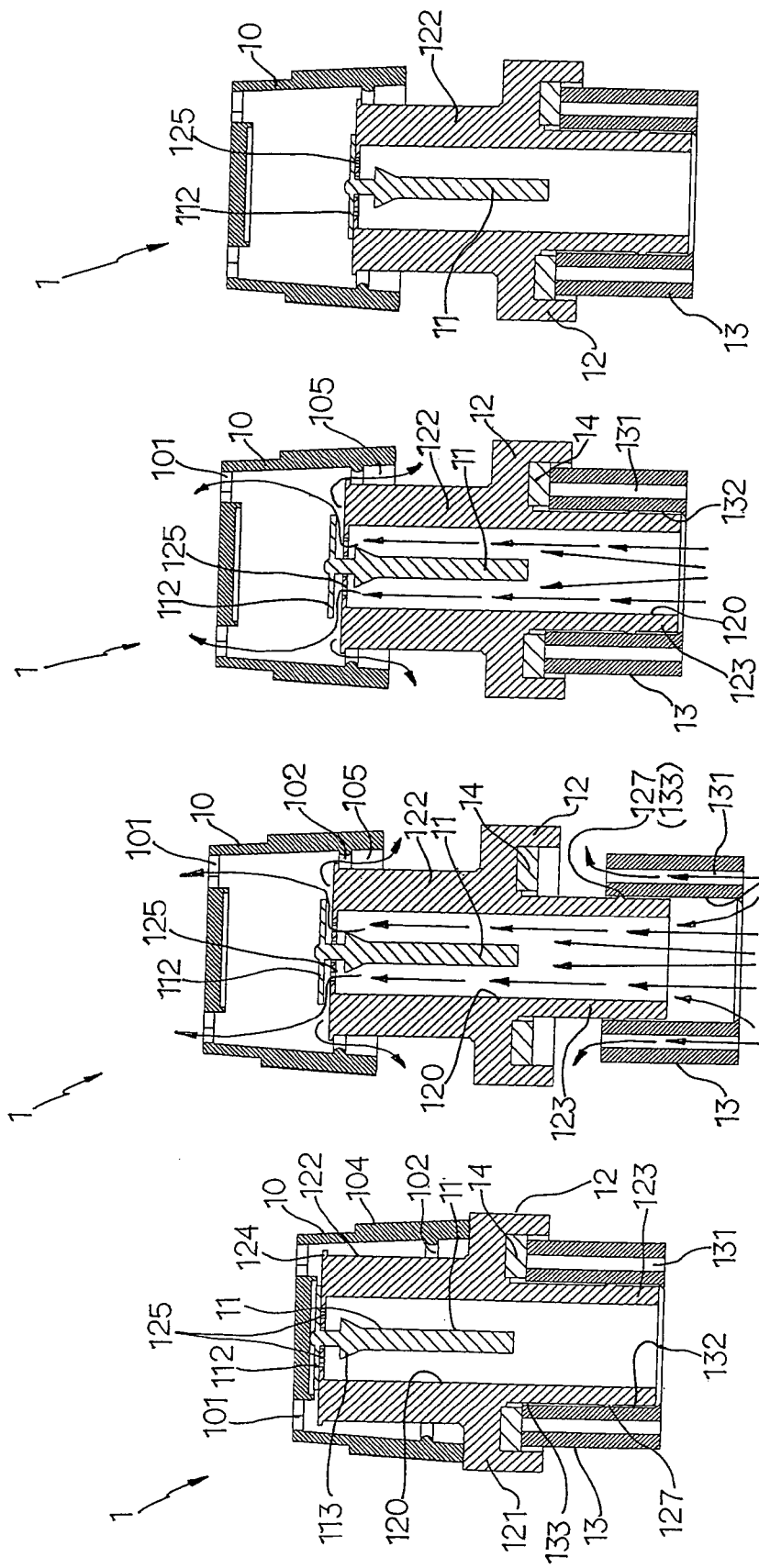

AIR TAP ASSEMBLY

BACKGROUND OF THE INVENTION

1. Field of the Invention

The present invention relates to an air tap assembly, and more particularly to an air tap assembly having an anti-reverse effect.

2. Description of the Related Art

A conventional air tap is mounted on an air cushion (or mattress) to introduce air into the air cushion by an inflator or in a manual manner so as to inflate the air cushion. However, the conventional air tap does not have an anti-reverse effect, so that the air is introduced through the air tap to flow into the air cushion freely. Thus, when the air cushion is compressed during the folding process, the air is easily introduced through the air tap into the air cushion due to a surface tension produced by a foam material mounted in the air cushion, thereby greatly causing inconvenience to a user when folding the air cushion.

SUMMARY OF THE INVENTION

In accordance with the present invention, there is provided an air tap assembly, comprising a mounting seat, a connecting member, a stop member, and an end cap, wherein:

the mounting seat has an inside formed with a passage and a peripheral wall formed with a plurality of conducting channels;

the connecting member is rotatably mounted on the mounting seat and includes a cylindrical body, a first pivot portion mounted on a first side of the cylindrical body and movably mounted in the passage of the mounting seat, and a second pivot portion mounted on a second side of the cylindrical body;

the connecting member has an inside formed with a guide channel extended through the first pivot portion, the cylindrical body and the second pivot portion;

the second pivot portion of the connecting member has a first end extended from the cylindrical body and a second end having a closed wall formed with a plurality of vent holes each communicating with the guide channel of the connecting member;

the stop member is mounted on the connecting member and has a distal end formed with a stop plate protruding outward from the second pivot portion of the connecting member to seal the vent holes of the second pivot portion of the connecting member; and the end cap is rotatably mounted on the connecting member and has a first end rested on the cylindrical body of the connecting member and a second end having a closed wall rested on the stop plate of the stop member and formed with a plurality of vent holes communicating with the vent holes of the second pivot portion of the connecting member.

The primary objective of the present invention is to provide an air tap assembly having an anti-reverse effect to prevents air from flowing back into the air cushion.

Another objective of the present invention is to provide an air tap assembly, wherein the stop plate of the stop member prevents the air from flowing back into the vent holes of the second pivot portion of the connecting member, so that the air tap assembly has an anti-reverse effect to prevents the air from flowing back into the air cushion, thereby facilitating a user folding the air cushion.

A further objective of the present invention is to provide an air tap assembly, wherein the air contained in the air cushion flows outward from the conducting channels of the mounting seat, the vent holes of the end cap and the gap between the end cap and the second pivot portion of the connecting member, so that the air rapidly leaks from the air cushion in a larger manner, thereby facilitating the user folding the air cushion.

Further benefits and advantages of the present invention will become apparent after a careful reading of the detailed description with appropriate reference to the accompanying drawings.

BRIEF DESCRIPTION OF THE DRAWINGS

FIG. 4 is a plan cross-sectional view of the air tap assembly as shown in FIG. 1;

FIG. 5 is a schematic operational view of the air tap assembly as shown in FIG. 4;

FIG. 6 is a schematic operational view of the air tap assembly as shown in FIG. 5;

FIG. 7 is a schematic operational view of the air tap assembly as shown in FIG. 6.

DETAILED DESCRIPTION OF THE INVENTION

Figure 1:
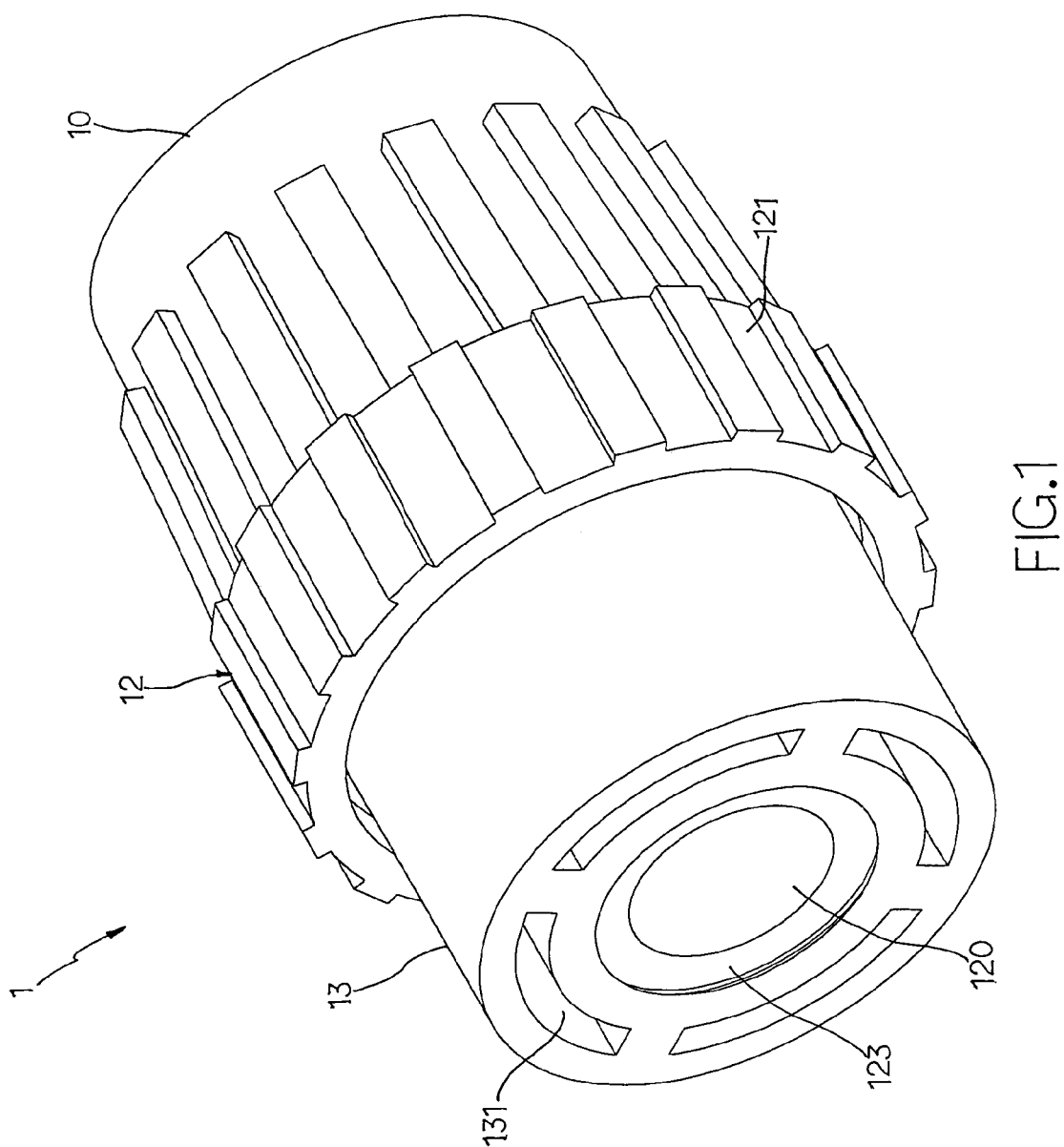
FIG. 1 is a perspective view of an air tap assembly in accordance with the preferred embodiment of the present invention.

Referring to the drawings and initially to FIGS. 1–4, an air tap assembly 1 in accordance with the preferred embodiment of the present invention comprises a mounting seat 13, a connecting member 12, a stop member 11, and an end cap 10.

The mounting seat 13 has a cylindrical shape and has an inside formed with a passage 132 longitudinally extended through the mounting seat 13 and a peripheral wall formed with a plurality of conducting channels 131 each longitudinally extended through the mounting seat 13. The passage 132 of the mounting seat 13 has a first end formed with an annular stop flange 133 radially extending inward therefrom and a second end formed with an inner thread 134. Each of the conducting channels 131 of the mounting seat 13 has an arc-shaped cross-section.

The connecting member 12 is rotatably mounted on the mounting seat 13 and includes a cylindrical body 121, a first pivot portion 123 mounted on a first side of the cylindrical body 121 and movably mounted in the passage 132 of the mounting seat 13, and a second pivot portion 122 mounted on a second side of the cylindrical body 121. The connecting member 12 has an inside formed with a guide channel 120 extended through the first pivot portion 123, the cylindrical body 121 and the second pivot portion 122.

The cylindrical body 121 of the connecting member 12 has an inside formed with a receiving recess 129 and has a periphery formed with a plurality of anti-skid ribs 1211.

A washer 14 is mounted on the cylindrical body 121 of the connecting member 12 to move therewith and rested on the mounting seat 13 to seal the conducting channels 131 of the mounting seat 13. Preferably, the washer 14 is received in the receiving recess 129 of the cylindrical body 121 of the connecting member 12.

The first pivot portion 123 of the connecting member 12 has a first end extended from the cylindrical body 121 and a second end formed with an outer thread 128 screwed into the inner thread 134 of the mounting seat 13. The first pivot portion 123 of the connecting member 12 has a mediate portion formed with an annular limit rib 127 that is movable to abut the stop flange 133 of the mounting seat 13 to prevent the first pivot portion 123 of the connecting member 12 from being moved outward excessively relative to the mounting seat 13.

The second pivot portion 122 of the connecting member 12 has a first end extended from the cylindrical body 121 and formed with an outer thread 126 and a second end having a closed wall formed with a mounting hole 1250 and a plurality of vent holes 125 each communicating with the guide channel 120 of the connecting member 12. The second end of the second pivot portion 122 of the connecting member 12 has a periphery formed with an annular stop edge 124 radially extending outward therefrom.

The stop member 11 is mounted on the connecting member 12 and has a distal end formed with a circular stop plate 112 protruding outward from the second pivot portion 122 of the connecting member 12 to seal the vent holes 125 of the second pivot portion 122 of the connecting member 12. The stop member 11 is movably mounted in the mounting hole 1250 of the second pivot portion 122 of the connecting member 12 and has a mediate portion formed with a flexible wedge-shaped stop rib 113 located in the guide channel 120 of the connecting member 12 and movable to abut the closed wall of the second pivot portion 122 of the connecting member 12. Preferably, the stop rib 113 of the stop member 11 is forced into the mounting hole 1250 of the second pivot portion 122 of the connecting member 12 by its flexibility.

The end cap 10 is rotatably mounted on the connecting member 12 and is movably mounted on the second pivot portion 122 of the connecting member 12. The end cap 10 has a first end rested on the cylindrical body 121 of the connecting member 12 and a second end having a closed wall rested on the stop plate 112 of the stop member 11 and formed with a plurality of vent holes 101 communicating with the vent holes 125 of the second pivot portion 122 of the connecting member 12. The first end of the end cap 10 is formed with an inner thread 103 screwed onto the outer thread 126 of the second pivot portion 122 of the connecting member 12. The first end of the end cap 10 is formed with an annular limit rib 102 that is movable to abut the stop edge 124 of the second pivot portion 122 of the connecting member 12 to prevent the end cap 10 from being moved outward excessively relative to the second pivot portion 122 of the connecting member 12. The end cap 10 has a periphery formed with a plurality of anti-skid ribs 104.

Figure 2:
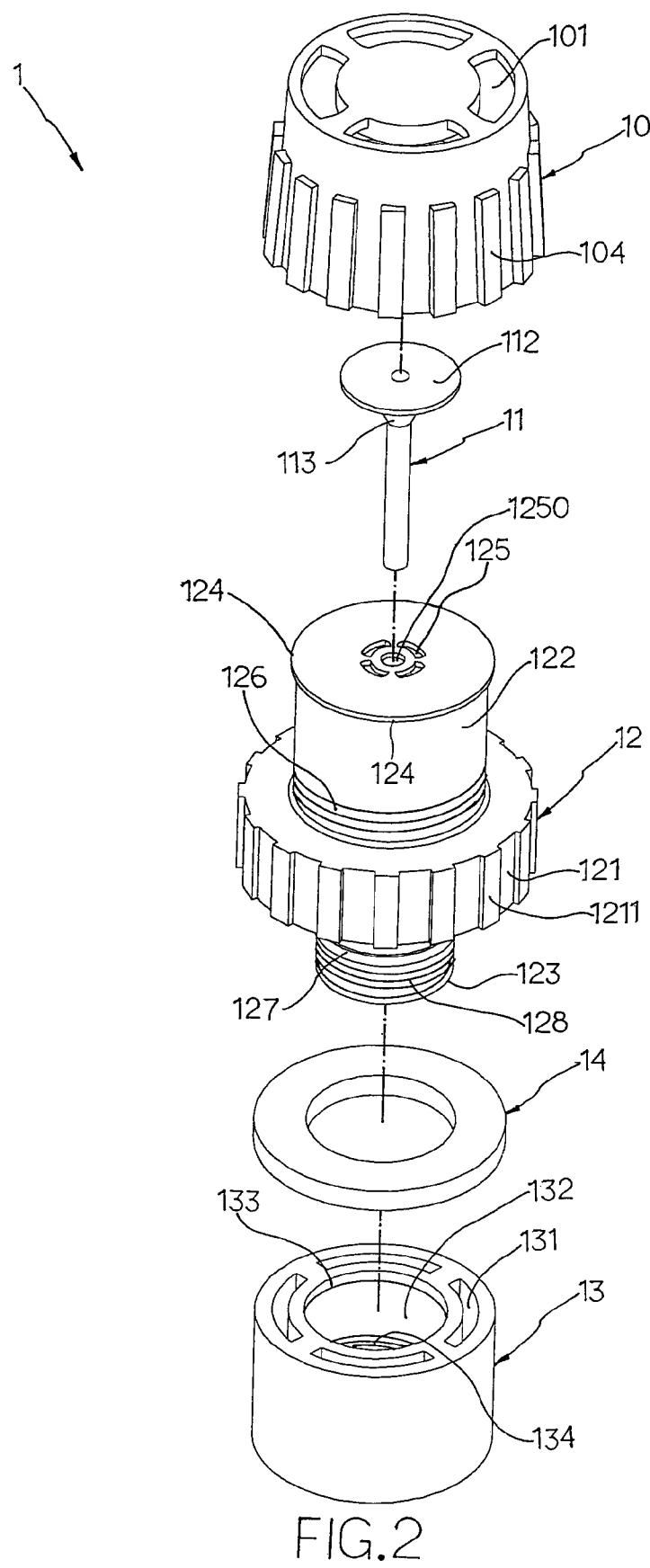
FIG. 2 is an exploded perspective view of the air tap assembly as shown in FIG. 1.
Figure 3:
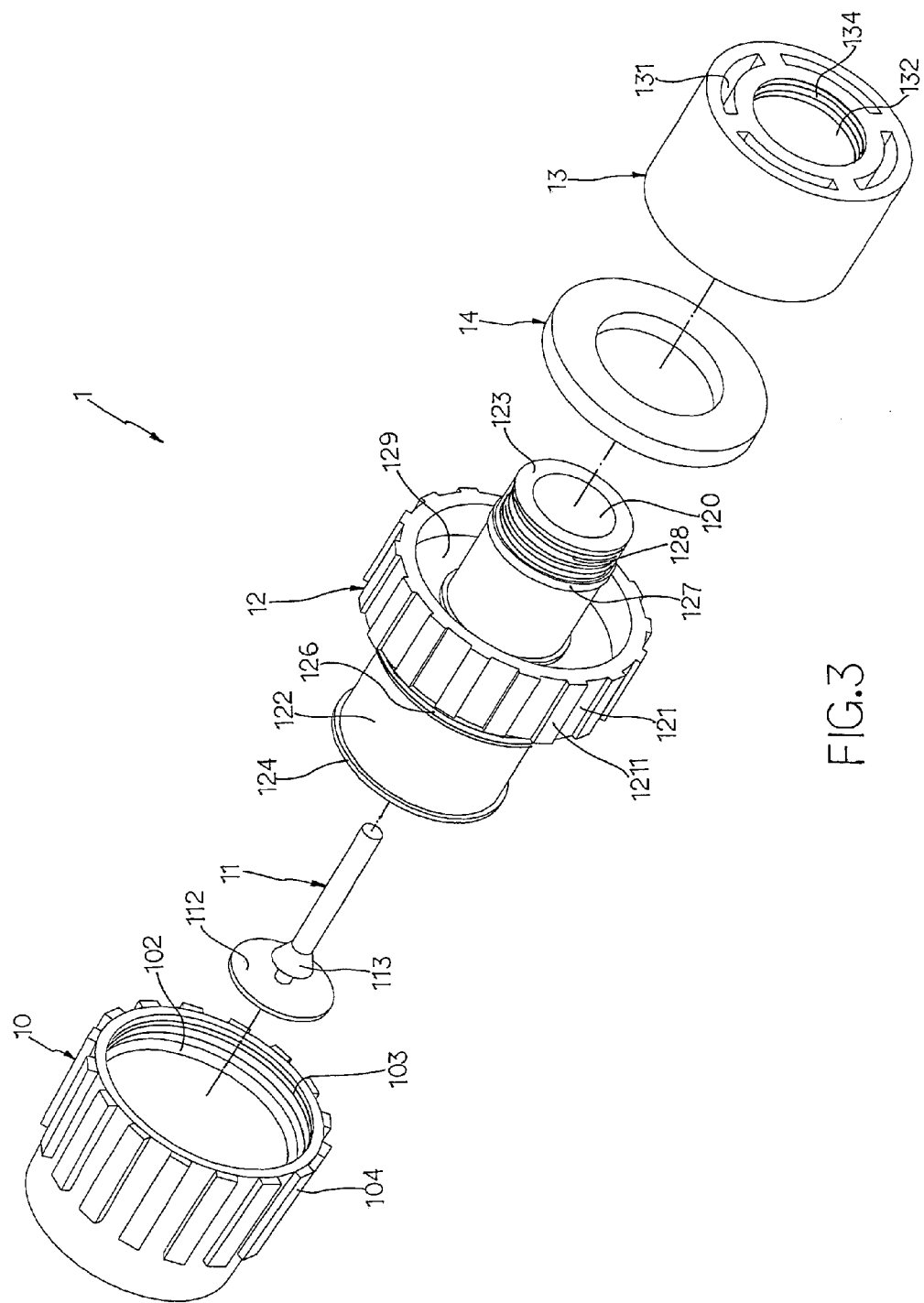
FIG. 3 is an exploded perspective view of the air tap assembly as shown in FIG. 1.
Figure 8:
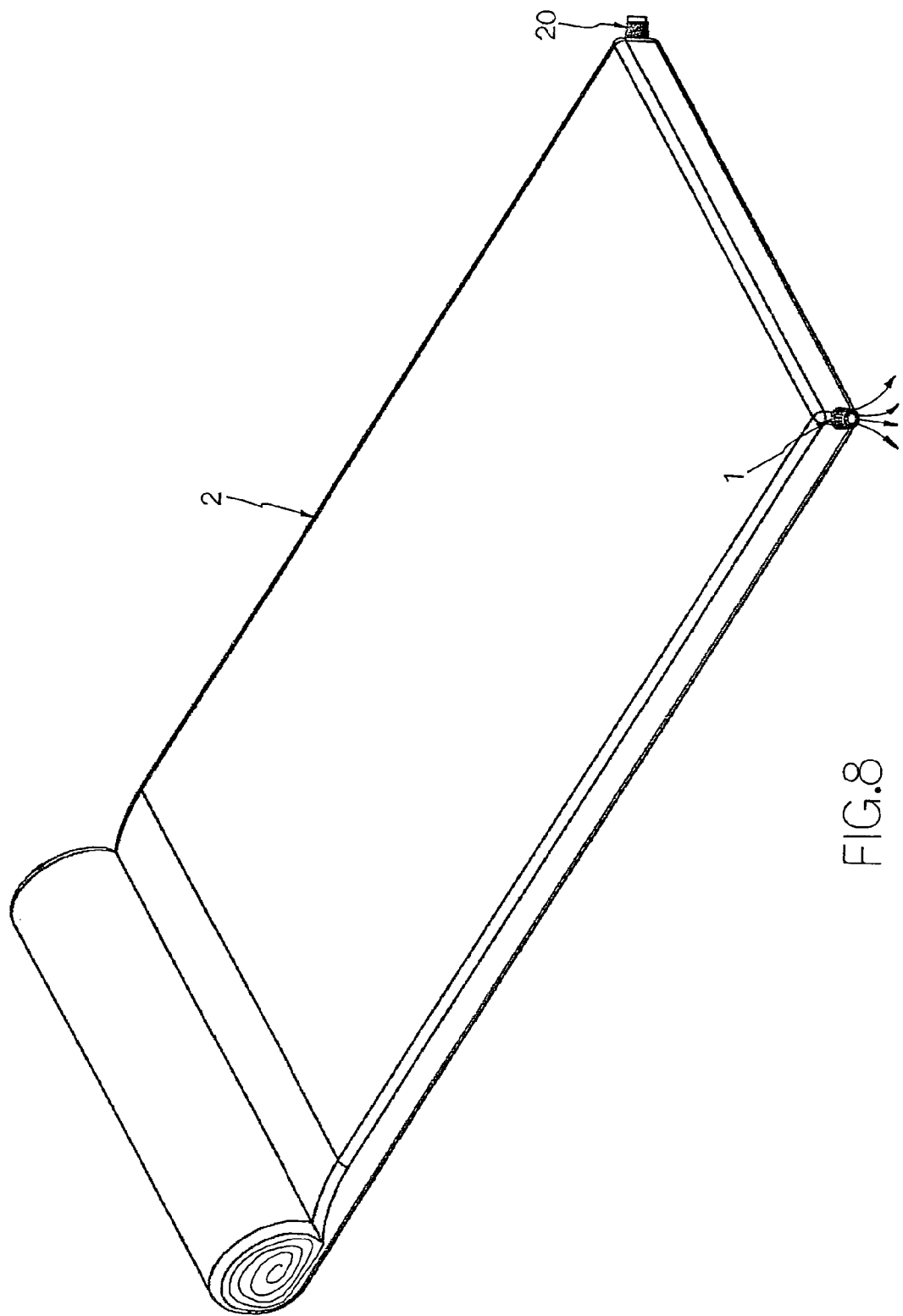
FIG. 8 is a perspective view showing use of the air tap assembly in accordance with the preferred embodiment of the present invention.

In operation, referring to FIGS. 4–8 with reference to FIGS. 1–3, the air tap assembly 1 is mounted on an air cushion (or mattress) 2, with the mounting seat 13 being mounted to a corner of the air cushion 2 as shown in FIG. 8. The air is introduced into the air cushion 2 by an air valve 20 mounted to the other corner of the air cushion 2 to inflate the air cushion 2.

At this time, the connecting member 12 is screwed on the mounting seat 13, and the end cap 10 is screwed on the connecting member 12 as shown in FIG. 4, so that the air contained in the air cushion 2 will not leak from the air tap assembly 1.

When a user wishes to fold the air cushion 2, the connecting member 12 is unscrewed from the mounting seat 13 as shown in FIG. 5, so that the washer 14 is detached form the conducting channels 131 of the mounting seat 13 to connect the conducting channels 131 of the mounting seat 13 to the ambient environment. In such a manner, the air cushion 2 is compressed so that the air contained in the air cushion 2 is compressed to flow outward from the conducting channels 131 of the mounting seat 13 directly.

At the same time, the end cap 10 is unscrewed from the connecting member 12 as shown in FIG. 5 to detach the stop plate 112 of the stop member 11 from the end cap 10, so that the stop member 11 is movable on the second pivot portion 122 of the connecting member 12. In such a manner, the air cushion 2 is compressed and the air in the air cushion 2 is compressed to push the stop plate 112 of the stop member 11 to move outward relative to the second pivot portion 122 of the connecting member 12, thereby detaching the stop plate 112 of the stop member 11 from the vent holes 125 of the second pivot portion 122 of the connecting member 12, so that the air contained in the air cushion 2 in turn flows through the passage 132 of the mounting seat 13, the guide channel 120 of the connecting member 12, the vent holes 125 of the second pivot portion 122 of the connecting member 12 and the vent holes 101 of the end cap 10 and then flows outward from the vent holes 101 of the end cap 10 and a gap 105 defined between the end cap 10 and the second pivot portion 122 of the connecting member 12 as shown in FIG. 5.

Thus, the air contained in the air cushion 2 flows outward from the conducting channels 131 of the mounting seat 13, the vent holes 101 of the end cap 10 and the gap 105 between the end cap 10 and the second pivot portion 122 of the connecting member 12, so that the air rapidly leaks from the air cushion 2 in a larger manner.

Alternatively, the connecting member 12 is screwed on the mounting seat 13, and the end cap 10 is unscrewed from the connecting member 12 as shown in FIG. 6, so that the conducting channels 131 of the mounting seat 13 is sealed by the washer 14.

Thus, the air contained in the air cushion 2 flows outward from the vent holes 101 of the end cap 10 and the gap 105 between the end cap 10 and the second pivot portion 122 of the connecting member 12 as shown in FIG. 6, so that the air leaks from the air cushion 2 in a smaller manner.

As shown in FIG. 7, after the air flows outward from the air cushion 2 completely, the push force applied on the stop plate 112 of the stop member 11 is removed, so that the stop plate 112 of the stop member 11 is returned to the original position to seal the vent holes 125 of the second pivot portion 122 of the connecting member 12.

Finally, the end cap 10 is screwed on the connecting member 12 as shown in FIG. 4 to press and position the stop plate 112 of the stop member 11 so as to the vent holes 125 of the second pivot portion 122 of the connecting member 12, so that the air contained in the air cushion 2 will not leak from the air tap assembly 1.

Accordingly, the stop plate 112 of the stop member 11 prevents the air from flowing back into the vent holes 125 of the second pivot portion 122 of the connecting member 12, so that the air tap assembly 1 has an anti-reverse effect to prevents the air from flowing back into the air cushion 2, thereby facilitating a user folding the air cushion 2. In addition, the air contained in the air cushion 2 flows from the conducting channels 131 of the mounting seat 13, the vent holes 101 of the end cap 10 and the gap 105 between the end cap 10 and the second pivot portion 122 of the connecting member 12, so that the air rapidly leaks from the air cushion 2 in a larger manner, thereby facilitating the user folding the air cushion 2.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. An air tap assembly, comprising a mounting seat, a connecting member, a stop member, and an end cap, wherein:

the mounting seat has an inside formed with a passage and a peripheral wall formed with a plurality of conducting channels;

the connecting member is rotatably mounted on the mounting seat and includes a cylindrical body, a first pivot portion mounted on a first side of the cylindrical body and movably mounted in the passage of the mounting seat, and a second pivot portion mounted on a second side of the cylindrical body;

the connecting member has an inside formed with a guide channel extended through the first pivot portion, the cylindrical body and the second pivot portion;

the second pivot portion of the connecting member has a first end extended from the cylindrical body and a second end having a closed wall formed with a plurality of vent holes each communicating with the guide channel of the connecting member;

the stop member is mounted on the connecting member and has a distal end formed with a stop plate protruding outward from the second pivot portion of the connecting member to seal the vent holes of the second pivot portion of the connecting member; and the end cap is rotatably mounted on the connecting member and has a first end rested on the cylindrical body of the connecting member and a second end having a closed wall rested on the stop plate of the stop member and formed with a plurality of vent holes communicating with the vent holes of the second pivot portion of the connecting member.

2. The air tap assembly in accordance with claim 1, wherein the passage of the mounting seat has a first end formed with an annular stop flange radially extended inward, and the first pivot portion of the connecting member has a mediate portion formed with an annular limit rib that is movable to abut the stop flange of the mounting seat to prevent the first pivot portion of the connecting member from being moved outward excessively relative to the mounting seat.

3. The air tap assembly in accordance with claim 1, wherein the passage of the mounting seat has a second end formed with an inner thread, and the first pivot portion of the connecting member has a first end extended from the cylindrical body and a second end formed with an outer thread screwed into the inner thread of the mounting seat.

4. The air tap assembly in accordance with claim 1, wherein the cylindrical body of the connecting member has a periphery formed with a plurality of anti-skid ribs.

5. The air tap assembly in accordance with claim 1, further comprising a washer mounted on the cylindrical body of the connecting member to move therewith and rested on the mounting seat to seal the conducting channels of the mounting seat.

6. The air tap assembly in accordance with claim 5, wherein the cylindrical body of the connecting member has an inside formed with a receiving recess, and the washer is received in the receiving recess of the cylindrical body of the connecting member.

7. The air tap assembly in accordance with claim 1, wherein the first end of the second pivot portion of the connecting member is formed with an outer thread, and the first end of the end cap is formed with an inner thread screwed onto the outer thread of the second pivot portion of the connecting member.

8. The air tap assembly in accordance with claim 1, wherein the closed wall of the second pivot portion of the connecting member is formed with a mounting hole communicating with the guide channel of the connecting member, and the stop member is movably mounted in the mounting hole of the second pivot portion of the connecting member.

9. The air tap assembly in accordance with claim 1, wherein the stop member has a mediate portion formed with a flexible stop rib located in the guide channel of the connecting member and movable to abut the closed wall of the second pivot portion of the connecting member.

10. The air tap assembly in accordance with claim 9, wherein the stop rib of the stop member is wedge-shaped.

11. The air tap assembly in accordance with claim 1, wherein the second end of the second pivot portion of the connecting member has a periphery formed with an annular stop edge radially extended outward, and the first end of the end cap is formed with an annular limit rib that is movable to abut the stop edge of the second pivot portion of the connecting member to prevent the end cap from being moved outward excessively relative to the second pivot portion of the connecting member.

12. The air tap assembly in accordance with claim 1, wherein the end cap is movably mounted on the second pivot portion of the connecting member.

13. The air tap assembly in accordance with claim 1, wherein the end cap has a periphery formed with a plurality of anti-skid ribs.

14. The air tap assembly in accordance with claim 1, wherein the mounting seat has a cylindrical shape.

15. The air tap assembly in accordance with claim 1, wherein the passage is longitudinally extended through the mounting seat.

16. The air tap assembly in accordance with claim 1, wherein each of the conducting channels is longitudinally extended through the mounting seat.

17. The air tap assembly in accordance with claim 1, wherein each of the conducting channels of the mounting seat has an arc-shaped cross-section.

18. The air tap assembly in accordance with claim 1, wherein the stop plate of the stop member has a circular shape.

* * * * *